(12) United States Patent
Larin

(10) Patent No.: US 9,425,486 B2
(45) Date of Patent: Aug. 23, 2016

(54) COMPOSITION FOR EXTENDING LIFE OF LEAD ACID BATTERIES

(71) Applicant: BATTERY SOLUTION INTERNATIONAL LTD., Carmiel (IL)

(72) Inventor: Emilia Larin, Jerusalem (IL)

(73) Assignee: BATTERY SOLUTION INTERNATIONAL LTD., Carmiel (IL)

( * ) Notice: Subject to any disclaimer, the term of this patent is extended or adjusted under 35 U.S.C. 154(b) by 0 days.

(21) Appl. No.: 14/423,649

(22) PCT Filed: Aug. 26, 2013

(86) PCT No.: PCT/IL2013/050717
§ 371 (c)(1),
(2) Date: Feb. 24, 2015

(87) PCT Pub. No.: WO2014/033708
PCT Pub. Date: Mar. 6, 2014

(65) Prior Publication Data
US 2015/0303523 A1 Oct. 22, 2015

(30) Foreign Application Priority Data

Aug. 27, 2012 (IL) .......................................... 221668

(51) Int. Cl.
*H01M 10/08* (2006.01)
*H01M 10/06* (2006.01)
*C08L 1/28* (2006.01)
*C08L 1/02* (2006.01)
*C08L 5/00* (2006.01)
*H01M 2/36* (2006.01)

(52) U.S. Cl.
CPC ................ *H01M 10/08* (2013.01); *C08L 1/02* (2013.01); *C08L 1/286* (2013.01); *C08L 5/00* (2013.01); *H01M 2/364* (2013.01); *H01M 10/06* (2013.01); *C08L 2205/025* (2013.01); *H01M 2/362* (2013.01); *H01M 2300/0011* (2013.01); *Y02E 60/126* (2013.01); *Y02T 10/7016* (2013.01)

(58) Field of Classification Search
CPC ..... H01M 10/08; H01M 10/06; H01M 2/362; H01M 2/364
See application file for complete search history.

(56) References Cited

U.S. PATENT DOCUMENTS

| 5,945,236 A | 8/1999 | Willis |
| 7,160,645 B2 | 1/2007 | Kozawa et al. |
| 2010/0075231 A1* | 3/2010 | Armstrong .............. H01M 4/14 429/304 |

FOREIGN PATENT DOCUMENTS

| GB | 2 071 339 | 9/1981 |
| WO | WO 94/14828 | 7/1994 |

OTHER PUBLICATIONS

International Search Report for International Application No. PCT/IL2013/050717 mailed Nov. 28, 2013 (2 pages).

* cited by examiner

*Primary Examiner* — Jane Rhee
(74) *Attorney, Agent, or Firm* — Merchant & Gould P.C.

(57) ABSTRACT

An additive is for extending the useful life-span of the lead acid batteries. The additive is a safe and environmentally harmless material in the form of an aqueous liquid or an easy-to-use capsule. A method refurbishes lead acid batteries and extends their life-span.

14 Claims, No Drawings

COMPOSITION FOR EXTENDING LIFE OF LEAD ACID BATTERIES

This application is a National Stage Application of PCT/IL2013/050717, filed 26 Aug. 2013, which claims benefit of Serial No. 221668, filed 27 Aug. 2012 in Israel and which applications are incorporated herein by reference. To the extent appropriate, a claim of priority is made to each of the above disclosed applications.

FIELD OF THE INVENTION

The present invention relates to a method of refurbishing a lead acid battery, and to a liquid or solid composition to be added to the battery electrolyte for use in extending the useful life-span of the battery.

BACKGROUND OF THE INVENTION

Lead-acid batteries are still the main economic alternative as electric sources in most cars, trucks, buses, tractors, and motorcycles. They are used in boats, planes, submarines, electric cars, forklifts, luggage and other transportation, wheelchairs, golf and similar carts, as well as backup power supplies for telephone and computer centers, in telecommunications, in electrical power stations, in alarm and security systems, in load leveling, in emergency lights, as uninterrupted power supplies in case of power failure and during emergencies, for solar power generated electricity storage, and elsewhere.

The electromotive force in the lead acid battery is generated in the comproportionation redox reaction between lead (oxidation state 0) and lead dioxide (oxidation state 4) in aqueous sulfuric acid, resulting in lead sulfate (oxidation state 2), while consuming sulfuric acid. Beside several kilograms lead, the batteries contain additional toxic metals and sulfuric acid as the electrolyte, which makes their production and disposal one of the gravest economic and environmental problems, as there are two billion cars and trucks worldwide. Therefore, much efforts have been successfully exerted on developing technologies for recycling lead from used batteries. Not less important would be to reuse the batteries or to extend their life-span, but these efforts have been less successful.

The redox reaction product, lead sulfate, which accumulates during the production of the electrical current, covers the plates and reduces the surface of the reactive materials, lowering the voltage and the capacity of the battery, increasing the cell internal resistance. The process, called sulfation, leads to expanding sulfate deposits, to undesired crystallization of the amorphous deposit, to prolonging charging times while achieving only incomplete charging, to increasing charging temperatures, to loosening debris from plates to sediments, and it may lead to short-circuiting the cell or cracking the plates, and eventually to destroying the battery. When recharging the battery, while replenishing the consumed sulfuric acid, the lead sulfate should be ideally completely returned to the reactive components by the reverse—disproportionation—reaction, but a part of the material is never returned to lead and lead dioxide during repeated discharging and recharging. Therefore, a lead-acid battery has a limited life-span of several years, usually between two and five years.

There are physical techniques aiming at reversing the sulfation process, at least partially, by employing various regimens of electric treatments, and restoring some capacity, but the effects are quite limited. There have also been attempts to affect the battery ageing by the use of chemical additives in the electrolyte. U.S. Pat. No. 5,945,236 describes a mixture of sulfates, comprising toxic heavy metals, as an additive to extend a battery life, the additive being added in an amount of 20 grams per 1 kg lead. U.S. Pat. No. 7,160,645 relates to prolonging the battery life by adding to the electrolyte a mixture of lignin and a polymer like PVA together with a heavy metal salt.

It is an object of this invention to provide a nontoxic and environmentally safe additive to the electrolyte of lead acid battery for extending a useful life-span of the battery.

It also an object of this invention to provide an additive to the electrolyte of lead acid battery excluding heavy metals.

It is another object of this invention to provide an additive to the electrolyte of lead acid battery for improving the battery performance.

It is a further object of this invention to provide an additive to the electrolyte of lead acid battery to be used in refilling and regenerating a used battery.

It is a still further object of this invention to provide a method for extending the useful life of lead acid battery, comprising admixing into the electrolyte of said battery an additive without heavy metals.

Other objects and advantages of present invention will appear as description proceeds.

SUMMARY OF THE INVENTION

The present invention provides an additive for the electrolyte of lead acid batteries, comprising at least one uncharged polysaccharide (PS) and at least one charged polysaccharide, the polysaccharides having an average polymerization degree of at least 100, and said charged polysaccharide having an average charge density of at least 0.1. Said uncharged PS preferably comprises cellulose, and said charged PS preferably comprises a carboxylated PS, sulfated PS, or a mixture thereof. Said sulfated PS may comprise, for example, algal polysaccharides. An additive for the electrolyte of lead acid batteries according to the invention may have a form selected from a concentrated solution, a concentrated suspension, an essentially dry powder, and tablet or capsule. When using the term "average polymerization degree", intended is the weight average of the number of monomer units per a polymer molecule. When using the term "average charge density", intended is the total number of charged groups in all polymer molecules divided by the total number of monomer units in the molecules. The charged groups may be, for example, a carboxyl group or a sulfate group or an amino group, and preferably will be present in an amount higher than one per one hundred monomer units. Preferably, said charged polysaccharide has negative charge. In a preferred embodiment, the additive of the invention comprises a charged polysaccharide which constitutes at least 50 wt % of the polysaccharides, such as at least 60 wt %, or 70 wt %. In one embodiment, the charged PS constitutes 80-90 wt % of all polysaccharides. The average charge density of said charged polysaccharide is at least 0.02, preferably at least 0.1, for example at least 0.2, or at least 0.3 or at least 0.4 or at least 0.5. The additive for the electrolyte of lead acid batteries according to the invention preferably confers the electrolyte a concentration of polysaccharides of from about 0.01% to 0.07%, for example between 0.03 and 0.06%. Throughout the present text, the concentration of 1% means 1 g per 100 ml when not noted otherwise. In a preferred embodiment, the additive of the invention comprises salts constituting up to 50 wt % of the polysaccharides, for example up to 40 wt %, such as 30 wt %, possibly 2-20 wt % or 0.1-2 wt %. Said salts may comprise, sodium chloride, magnesium sulfate, calcium chloride, and other salts or mixtures thereof. In one embodiment, the additive comprises a mixture of sodium chloride and magnesium sulfate. In one aspect of the invention, the additive exhibits a conductivity of from 0.5 mS/cm to 10 mS/cm when diluted in water to the concentration of about 1% of polysaccharides. In other aspect of the invention, the additive exhibits a viscosity at 25° C. of from 5 cP to 100 cP when diluted in water to the concentration of 1% of polysaccharides. The additive usually contains from 1 to 10% polysaccharides. In one preferred embodiment of the invention, the additive for the electrolyte of lead acid batteries comprises at least one charged polysaccharide having a polymerization degree of at least 100 and an average charge density of from about 0.1 to about 0.9. In other preferred embodiment of the invention, the additive for the electrolyte of lead acid batteries comprises at least one uncharged polysaccharide together with at least one charged polysaccharide, the charged one having an average charge density of at least 0.2. Preferably, said uncharged polysaccharide is an uncharged cellulose-based polysaccharide, and said charged polysaccharide is a cellulose-based charged polysaccharide, wherein said polysaccharides have an average polymerization degree of between 200 and 1000, and wherein said charged polysaccharide has an average charge density of between 0.1 and 1.0, preferably between 0.5 and 0.9. In a preferred embodiment, the additive comprises a polysaccharide selected from cellulose derivatives. In other preferred embodiment, the additive comprises two polysaccharides selected from cellulose derivatives. In one embodiment, the derivatives comprise carboxymethyl cellulose and other cellulose derivatives, charged or non-charged, such as for example ethers and others. The charged polysaccharide may comprise an artificial material, or natural one like plant or animal extract. The additive may comprise, for example a mixture of carboxymethyl cellulose and hydroxyethyl cellulose. Other embodiments may comprise additives containing methyl cellulose or hydroxypropyl cellulose, mixed with other components. In one embodiment of the invention, the additive comprises one or more cellulose derivatives together with other polysaccharides. In one embodiment, the additive comprises an uncharged polymer together with an algal polysaccharide, such as methylcellulose and carrageenan. In still another embodiment, the additive may further comprise additional polymers, including natural and synthetic polymers. The additive for the electrolyte of lead acid batteries according to the invention may be a concentrated stock, either solution or suspension, ready for dilution, for example comprising polysaccharides in a concentration of from 1 to 10%.

The invention is directed to an electrolyte for lead acid batteries, comprising at least 32% sulfuric acid, at least one uncharged polysaccharide and at least one charged polysaccharide, the polysaccharides having an average polymerization degree of at least 100 and a total concentration of from 0.01% to 0.07%, and said charged polysaccharide having an average charge density of at least 0.1. The electrolyte may comprise, for example, 35% sulfuric acid and two or more polysaccharides in a total concentration of from 0.01 to 0.07%. The charged PS preferably constitutes at least 50 wt % of total polysaccharides. In one aspect, the electrolyte according to the invention comprises at least one uncharged polysaccharide, preferably cellulose derivative, and at least one negatively charged polysaccharide, and salts of in an amount of up to 50 wt % of the polysaccharides. All the polysaccharides have an average polymerization degree of at least 100, such as at least 200, for example about 400 or more, and an average charge density of at least 0.01, such as at least 0.1 or at least 0.5. The electrolyte may, for example, comprise one charged and one uncharged polysaccharide, together having an average polymerization degree between 200 and 1000, for example between 300 and 600, wherein the polysaccharides together have an average charge density of between 0.02 to 0.6. Obviously, the average charge density in the mixture of one charged and one uncharged polysaccharide is regulated by the ratio between two polysaccharides; for example, a charged cellulose-based polysaccharide having a charge density of 0.6 may be mixed with uncharged cellulose based polysaccharide in a ratio of 1:1, providing an average charge density of the polysaccharides of about 0.3. The invention is directed to a lead acid battery comprising the above-described electrolyte.

The invention provides a method for extending life of lead acid batteries, comprising incorporating into the electrolyte of said batteries an additive as described above. The invention also provides a method for refurbishing lead acid batteries, comprising replacing the electrolyte in said batteries by fresh electrolyte comprising at least 32% sulfuric acid, at least one uncharged polysaccharide and at least one charged polysaccharide, the polysaccharides having an average polymerization degree of at least 100 and an average charge density of at least 0.05, the charged polysaccharide having preferably an average charge density of at least 0.1. The method of the invention preferably comprising incorporating into said electrolyte an additive comprising an uncharged polysaccharide, at least the same amount of a charged polysaccharide, and salts in an amount of up to 50 wt % of the polysaccharides. The method for refurbishing lead acid batteries and/or extending the life-span thereof comprises incorporating the above additives to the electrolyte of said batteries, and further additional steps selected from charging a battery, cleaning inner surfaces of a battery, replacing the electrolyte of a battery, etc.

The additive of the invention, for use in extending a lead acid battery life or for use in refurbishing a used lead acid battery, may comprise an aqueous solution or suspension containing one or more polysaccharides in a total concentration of from about 10 to about 100 g/l. The additive, which is harmless to the human health and to the environment, is preferably added to the electrolyte to the final concentration of from 0.2 to 0.7 g polysaccharides per liter. For example, when adding the liquid additive to a functional battery, from 5 to 100 ml additive may be added, but a skilled user will easily calculate the desired amount. In some embodiment of the invention, the additive comprises other polymers selected from synthetic and natural non-branched polymers, soluble in water, preferably comprising hydroxyl groups. In other embodiments of the invention, the additive comprises low molecular weight components, including salts, dyes, surfactants, and crystal modifiers. Said salts preferably comprise alkali metals or alkaline earth metals in an amount of up to 50 wt % of the total polysaccharides. In a preferred embodiment of the invention, the additive comprises a magnesium salt. In other embodiment, the additive further comprises sodium chloride. The additive may comprise auxiliary components including fillers and compression aids.

DETAILED DESCRIPTION OF THE INVENTION

It has now been found that incorporating a mixture of cellulose based polymers in a relatively low concentration into the electrolyte of a lead acid battery, for example in an amount of 0.5 g/l, has surprisingly positive effects on the useful life of the battery. Various combinations of charged and uncharged cellulose derivatives were characterized from the viewpoint of their ability to extend the useful battery life.

Several mixtures were selected as both extending the life of a new battery and as returning to life a used battery. These mixtures included, for example, hydroxyalkyl cellulose and/or carboxymethyl cellulose. The inventors found that some of the mixtures even doubled the life expectancy of batteries, while lowering the maintenance costs.

In an important aspect of the present invention, the new additive is employed together with a special electrical regimen treatment.

The additive obviates the use of toxic components, including heavy metals, and predominantly includes components safe for both the environment and the human health, based mainly on the organic polymers, particularly polysaccharides.

Without wishing to be limited by any particular theory, the inventors believe that the employed polysaccharides contact the electrodes and, without lowering the conductivity and increasing the internal cell resistance, affect the microstructure of the lead sulfate, similarly to crystal modifiers, so that the crystal growth of lead sulfate deposits is prevented and the amount of lead sulfate capable of returning to the electrically active form is increased, the process being more efficient when the polysaccharide additive comprises both charged and non-charged polysaccharide molecules. The additive may assist in dissolving the sediments and in preventing their accumulation. This further results in the improvement of the battery performance, including the decrease of the charging time and the increase of battery stability and life-span. It was found that the presence of the additive in the electrolyte extends the battery life, and moreover, the used battery can be more efficiently returned to the work conditions when incorporating the additive after special physical and electrical treatments. Interestingly, comparisons of the instant additive with available additives showed to the inventors that the instant additive exhibited relatively higher mechanical strength when measured in a thin dried layer, and it exhibited relatively higher adhesion onto the lead sulfate particles as indicated by SEM pictures.

The invention, thus, relates to a method for refurbishing a used or already non-functional battery, regardless the intended use of the acid lead battery, including batteries for cars, trucks, telecom systems, various industrial systems, and the like. The typical loss of ability to regain its charge after discharging in a lead acid battery is reduced by the additive of the invention, while reducing the destructive sulfation process by the use of an environmentally-friendly material, which is biodegradable and complies with strict safety standards. The material may be stored over long periods of time without any special preservation requirements. The lead acid batteries are refurbished and/or their useful life-span is extended by means of an additive which is safe and environmentally harmless, while having the form of an aqueous liquid or an easy-to-use capsule. Capsules or tablets of any suitable size, according to the size of the volumes of batteries to be treated, can be prepared by known methods. If employing concentrated liquids, the component concentrations may be chosen such that the dilution is, for example, 10 ml per 1 liter of electrolyte.

The additive can thus be prepared and used in two forms, in a concentrated liquid form or in a dry form. In one embodiment, the components are admixed into deionized water. In an important embodiment, the solid components, eventually with minor amounts of water, are compressed to form tablets. In other important embodiment, the solid component are encapsulated. The advantages of capsule or tablet forms include simpler storage, transportation, and manipulation. Capsules or tablets are stable on storage. In some applications, solid forms, such as capsules, are directly added to the electrolyte, their components being advantageously released slowly in a process of reconditioning, charging, and discharging the battery. Moreover, the use of the solid forms precludes the dilution of sulfuric acid in the electrolyte.

The additive of the invention protects battery cells from developing crystals and prevents lead and paste from shedding to the bottom of the cell and from short-circuiting the plates. Installing the battery in the forklift or any other vehicle immediately upon completion of battery refurbishing will enhance the effect of the additive in extending the battery life. The preferred additive comprises at least two polysaccharides, at least one charged and at least one uncharged, and salts of alkali metals or alkaline earth metals. In some embodiments, the additive further comprises other polymers selected from natural and synthetic, preferably unbranched, polymers, both charged and uncharged.

The invention will enable to better handle one of the major pollutants—used lead acid batteries. Instead of discarding batteries or recycling their raw materials, whereby contaminating the environment, the instant invention enables to refurbish the batteries and return them to the continued work.

The invention will be further described and illustrated in the following examples.

EXAMPLE

Example 1

Preparing an Additive

Carboxymethyl cellulose in the amount corresponding to 3 g dry weight was placed into a beaker together with methyl cellulose corresponding to 1.5 g dry weight, water with 0.5 g magnesium sulfate and 0.5 g calcium chloride was added to 100 ml while stirring.

Extending Life of a New Acid Lead Battery

The above additive, or water (control), was added in an amount of 10 ml per 1 liter of the electrolyte. The parameters of two batteries, one with the additive and one with the control were checked, after repeated discharging and recharging. The estimated life span was extended by 45% when using the additive in comparison with the control.

Refurbishing a Used Lead Battery

Two used acid lead batteries, with large sulfate deposits and with lowered voltage even after long recharging, were treated by a special physical and electrical process, and refilled either with a standard electrolyte comprising 36% sulfuric acid or with the electrolyte according to the invention, comprising 36% sulfuric acid and 0.03% dry weight carboxymethyl cellulose with 0.015% dry methyl cellulose. The batteries were compared by their charging times, and the performance during repeated discharging and recharging. The battery comprising the additive according to the invention exhibited better performance in all aspects than the battery without the additive.

Example 2

Performance of Used Lead Batteries with Various Additives

A used lead battery, nominally 32V, 750 Ah, composed of 16 units each filled with 7 liters of electrolyte, was employed. Said 16 units were divided to four compartments, each compartment consisting of four units filled with one of four different electrolytes, all electrolytes comprising 35% sulfuric acid. Electrolyte A contained only sulfuric acid. Electrolyte B (an additive according to prior art) contained an additive prepared as follows: PVA of MW 126,000, heated 80-90° C. for five hours, was mixed with fine lignin, particles of 0.08-0.5 micron, and sodium sulfate; 75 ml of 5% mixture was added to each unit. Electrolyte C contained, per each unit, three capsules, 1 g per capsule, according to the invention; each capsule containing 0.6 g CMC (carboxymethyl cellulose), 0.1 g methylcellulose, 0.2 g magnesium sulfate, and 0.1 g sodium chloride. The capsule coating comprised cellulose derivatives soluble in sulfuric acid. Electrolyte D contained, for each unit, 1.8 g CMC, 0.3 g methylcellulose, 0.6 g magnesium sulfate, and 0.3 g sodium chloride dissolved in 75 ml deionized water, mixed for 30 minutes at 60° C.

The voltage was measured in each of said 16 units. The units were charged for four hours and discharged for four hours, in several cycles. Electrolyte B showed higher resistance and was more heated during the process than Electrolytes C and D. For each kind of additives (no additive and three types), the decrease of voltage after each discharge/recharge cycle was measured in all 4 units for 4 cycles, providing 16 values for each kind of additive. In all cases, the cells with Electrolyte B (according to prior art) exhibited highest voltage decrease in all cycles, higher than in case of no additive. In all cases, the cells with additives according to the invention, either solid (Electrolyte C) or liquid (Electrolyte D), exhibited lower voltage decrease than Electrolyte A in all discharge/recharge cycles.

In average, the lead acid battery units with the additive comprising PVA and lignin (according to the prior art) exhibited higher voltage losses than the units without any additives, wherein the losses increased from the first cycle to the forth cycle, the average voltage loss per cycle being about 20% higher than in the cells without additives. On the other hand, the lead acid battery cell units containing the additive according to the invention, both as liquid and capsule, exhibited voltage losses which did not increase from the first to the forth cycle, the average voltage loss per cycle being about 20% lower than in the cells without additives.

While this invention has been described in terms of some specific examples, many modifications and variations are possible. It is therefore understood that within the scope of the appended claims, the invention may be realized otherwise than as specifically described.

The invention claimed is:

1. An additive for the electrolyte of lead acid batteries comprising at least one uncharged polysaccharide and at least one charged polysaccharide, said polysaccharides having an average polymerization degree of 100 or more, and said charged polysaccharide having an average charge density of 0.1 or more, wherein said polysaccharides are selected from cellulose derivatives and algal polysaccharides; and
   wherein said uncharged polysaccharide comprises cellulose, and wherein said charged polysaccharide comprises a carboxylated polysaccharide, sulfated polysaccharide, or a mixture thereof.

2. An additive for the electrolyte of lead acid batteries according to claim 1, wherein said polysaccharides are selected from cellulose derivatives.

3. An additive for the electrolyte of lead acid batteries according to claim 1, having a form selected from a concentrated solution, a tablet, and a capsule.

4. An additive for the electrolyte of lead acid batteries according to claim 1, conferring the electrolyte a concentration of polysaccharides of from about 0.01% to 0.07%.

5. An additive for the electrolyte of lead acid batteries according to claim 1, exhibiting a conductivity of from 0.5 mS/cm to 10 mS/cm when diluted in water to a concentration of polysaccharides of about 1%.

6. An additive for the electrolyte of lead acid batteries according to claim 1, exhibiting a viscosity at 25° C. of from 5 cP to 100 cP when diluted in water to a concentration of polysaccharides of about 1%.

7. An additive for the electrolyte of lead acid batteries according to claim 1, comprising at least one charged polysaccharide having a polymerization degree of 100 or more and an average charge density of from 0.1 to 0.9.

8. An additive for the electrolyte of lead acid batteries comprising at least one uncharged polysaccharide, at least one charged polysaccharide, and salts of alkali metals or alkaline earth metals, said polysaccharides having an average polymerization degree of 100 or more, and said charged polysaccharide having an average charge density of 0.1 or more, wherein said polysaccharides are selected from cellulose derivatives and algal polysaccharides; wherein said charged polysaccharide constitutes at least 50 wt % of said polysaccharides, and said salts constitute up to 50 wt % of said polysaccharides.

9. An additive for the electrolyte of lead acid batteries according to claim 1, comprising at least one uncharged cellulose-based polysaccharide and at least one charged cellulose-based polysaccharide, wherein said polysaccharides have an average polymerization degree of between 200 and 1000, wherein said charged polysaccharide has an average charge density of between 0.1 and 0.9, and wherein said charged polysaccharide constitutes between 80 and 90 wt % of said polysaccharides.

10. An additive according to claim 2, wherein said derivatives comprise carboxymethyl cellulose, methyl cellulose, and hydroxypropyl cellulose.

11. An electrolyte for lead acid batteries, comprising at least 32% sulfuric acid, at least one uncharged polysaccharide, at least one charged polysaccharide, and salts of alkali metals or alkaline earth metals, wherein said polysaccharides are selected from cellulose derivatives and algal polysaccharides and said polysaccharides have an average polymerization degree of 100 or more and a total concentration of from 0.01% to 0.07%, wherein said charged polysaccharide has an average charge density of 0.1 or more and constitutes at least 50 wt % of said polysaccharides, and wherein said salts constitute up to 50 wt % of said polysaccharides.

12. The electrolyte according to claim 11, comprising at least one uncharged cellulose derivative, and at least one carboxylated or sulfated polysaccharide.

13. A method for extending life of lead acid batteries, comprising incorporating into the electrolyte of said batteries an additive according to claim 1, the additive being harmless to the human health and to the environment.

14. The method of claim 13, further comprising at least one of steps selected from recharging a battery, cleaning inner surfaces of a battery, and replacing the electrolyte of a battery.

* * * * *